(12) United States Patent
Masters et al.

(10) Patent No.: US 6,361,451 B1
(45) Date of Patent: Mar. 26, 2002

(54) VARIABLE STIFFNESS SHAFT

(75) Inventors: Brett P. Masters, Brookline; Marthinus C. van Schoor, Medford, both of MA (US)

(73) Assignee: Mide Technology Corporation, Medford, MA (US)

(*) Notice: Subject to any disclaimer, the term of this patent is extended or adjusted under 35 U.S.C. 154(b) by 0 days.

(21) Appl. No.: 09/158,173

(22) Filed: Sep. 21, 1998

(51) Int. Cl.[7] ............... A63B 5/06; A63B 49/02; A63B 53/08; A63B 59/02; A63B 59/06
(52) U.S. Cl. ............ 473/318; 473/513; 473/560; 473/564; 473/524; 43/18.1; 482/18; 280/819
(58) Field of Search ............ 473/316, 318–322, 473/513, 520–521, 523, 564, 558–560, 524; 43/18.1; 280/819; 482/18

(56) References Cited

U.S. PATENT DOCUMENTS

| | | | |
|---|---|---|---|
| 2,478,131 A | 8/1949 | Rossi ................ 43/18 |
| 2,992,828 A | 7/1961 | Stewart ............. 273/80 |
| 3,833,223 A | 9/1974 | Shulkin | |
| 4,024,666 A | 5/1977 | Carver | |
| 4,105,205 A | 8/1978 | Smolin et al. ....... 273/73 |
| 4,319,750 A | 3/1982 | Roy | |
| 4,410,183 A | * 10/1983 | Miller | |
| 4,685,682 A | * 8/1987 | Isabell | |
| 4,800,668 A | 1/1989 | Burrough | |
| 5,018,735 A | 5/1991 | Meredith et al. | |
| 5,054,781 A | 10/1991 | Soong | |
| 5,080,363 A | * 1/1992 | Soong | |
| 5,226,652 A | 7/1993 | Sato | |
| 5,265,872 A | 11/1993 | Tennent et al. | |
| 5,294,119 A | 3/1994 | Vincent et al. | |
| 5,478,075 A | 12/1995 | Foster et al. ....... 273/81 |
| 5,575,722 A | * 11/1996 | Saia ................ 473/300 |
| 5,634,861 A | 6/1997 | Yamamoto et al. ... 473/319 |
| 5,665,010 A | 9/1997 | Mori ............... 473/316 |
| 5,683,308 A | * 11/1997 | Monette ............ 473/318 |
| 5,755,826 A | 5/1998 | Beach et al. ....... 473/316 |
| 5,759,112 A | 6/1998 | Morell et al. ...... 473/316 |

FOREIGN PATENT DOCUMENTS

| | | |
|---|---|---|
| EP | 0 455 908 A | 11/1991 |
| FR | 823 727 A | 1/1938 |
| GB | 2 296 667 A | 7/1996 |
| JP | 54-40143 | * 11/1979 |
| JP | 9-56859 | * 3/1997 |

* cited by examiner

Primary Examiner—Stephen Blau
(74) Attorney, Agent, or Firm—George W. Neuner; Steven M. Jensen; Edwards & Angell, LLP

(57) ABSTRACT

An variable shaft, for example for a golf club. A hollow shaft has a cable or wire in the center, and means for varying the tension of the cable or wire. Increasing tension on the cable or wire places the shaft in compression and thereby reduces its bending stiffness. Preferably, the variation means are designed so that the wire tension may be quickly and easily varied by the user.

2 Claims, 4 Drawing Sheets

VARIABLE STIFFNESS SHAFT

FIELD OF THE INVENTION

The invention relates to methods of varying the bending stiffness or relative bending to torsional stiffness of a shaft member, for example in a piece of sporting equipment such as a golf club or hockey stick. The invention also relates to sporting equipment having variable stiffness shafts.

BACKGROUND OF THE INVENTION

Golf clubs are currently available in a wide range of bend stiffnesses. It has been found that less advanced golfers tend to prefer a softer shaft, whereby the flexing motion of the shaft can add distance to a driving stroke, by generating a more elevated ball trajectory for lower club head speed at impact. Advanced and professional golfers, on the other hand, tend to generate higher club head speeds during a swing, and find that driving distance increases with a stiffer shaft that provides lower ball trajectory with more ball back spin. These general trends are of course subject to wide personal variation; in addition, personal preferences as to shaft stiffness may vary from day to day and even from hole to hole, and may also be affected by weather conditions. For example, a lower drive is generally preferable when hitting into the wind than when hitting with the wind from behind. It has thus been found that golfers need to carry a large number of clubs to be prepared for these eventualities, and further, that as a golfer's abilities progress, new clubs are frequently required to accommodate changing shaft stiffness preferences.

Club stiffnesses are measured in terms of the natural frequency of the shaft with a standard weight dummy head. Clubs are available in a wide range of stiffnesses, typically on the order of 250±40 CPM (cycles per minute).

There is a similar wide range of personal variation in preferred stiffness of shafts in other types of sporting equipment, e.g., tennis rackets, ski poles, hockey sticks, baseball bats, fishing poles, hurling sticks, lacrosse sticks, and vaulting poles. In addition to differences from individual to individual, the preferred stiffness may vary from day to day, depending on fatigue and other personal variables, and the requirements of the particular sport.

It has been proposed in U.S. Pat. No. 3,833,223 to Skulking to provide a variable stiffness golf club by providing a set of interchangeable inserts for a single club. While this does allow adjustment of the stiffness of the club, it requires the golfer to carry a large set of inserts, and club stiffness is still restricted to the particular values associated with the inserts, rather than being continuously variable. The nuisance associated with frequent changes of the insert may prevent a golfer from making adjustments between holes which would maximize performance.

There thus still exists a need for a method of varying the bending stiffness of the shaft of a golf club or other piece of sporting equipment which allows easy variation through a continuous range of stiffness values.

SUMMARY OF THE INVENTION

In one aspect, the invention comprises a piece of sporting equipment having a variable stiffness hollow shaft. The stiffness is changed by using a variation means to adjust the tension on a tensioning means disposed in the hollow shaft. The tensioning means is attached to the shaft at two points. Thus, applying tension to the tensioning means causes compression in the shaft region between the two points. The tensioning means may, for example, be a wire or cable, or a plurality of wires or cables. Many variation means are possible, including a cam, a pinned retractable piece, a lockable lead screw (which may be adjusted by an external actuator), a pump, a sleeve screw, or a "set and forget" displacement actuator. The shaft may have one or more constraint inserts, which may be made, for example, of low density foam, plastic, or an elastomer. The constraint inserts impede dynamic variation of the tensioning means. They may be held in the shaft by compression fit or by adhesive. The sporting equipment may be, for example, a golf club, a tennis racket, a ski pole, a hockey stick, a baseball bat, a fishing pole, a hurling stick, a lacrosse stick, or a vaulting pole.

In another aspect, the invention comprises a method of varying the bend stiffness of a shaft of a piece of sporting equipment, by applying tension to a tensioning member disposed within the shaft and connected to it. Tension on the tensioning member places the shaft in compression and reduces its bend stiffness. The tension may be adjustable through a continuous range of values. The sporting equipment may be, for example, a golf club, a tennis racket, a ski pole, a hockey stick, a baseball bat, a fishing pole, a hurling stick, a lacrosse stick, or a vaulting pole. The tensioning means may be restrained from dynamic vibration.

BRIEF DESCRIPTION OF THE DRAWING

The invention is described with reference to the several figures of the drawing, in which.

DETAILED DESCRIPTION

Figure 1:
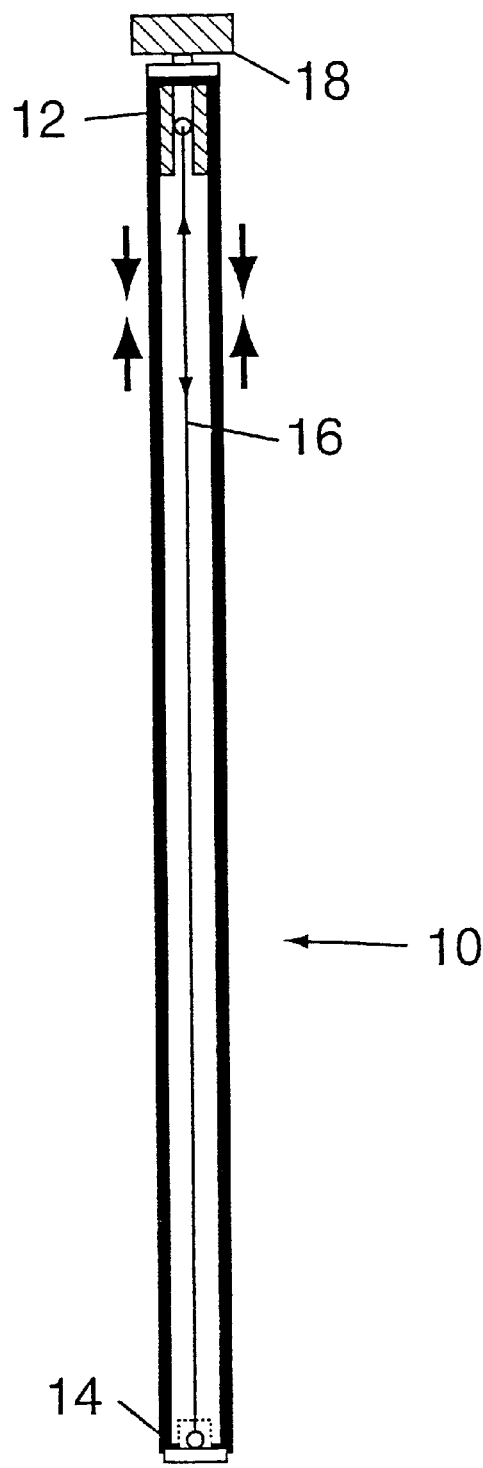
FIG. 1 shows an embodiment of a golf club shaft according to the invention.

It is well known that a beam's bending stiffness can be varied by preloading the beam longitudinal axis. The present invention involves the use of this principle to provide a variation mechanism for golf club shafts and other sporting equipment. The preload device is a simple wire or cable that is affixed internally in the shaft and a mechanism for varying the tension in the wire/cable. Tensioning the wire/cable compresses the shaft along its bending axis, reducing the effective bending stiffness as compared to that of the unloaded shaft. An advantage of the invention is that it allows the production of a shaft having a high torsional stiffness, enabling a rapid response to player wrist turnover action, but having a low bending stiffness, enabling the player to get the best ball trajectory for a given swing speed.

The fundamental behavior that this invention leverages is described by the general, unforced, one dimensional equation of motion for a beam, $$(EIw'')''+(Pw')'+m\ddot{w}=0 \qquad (1)$$

where EI is the elastic modulus times the shaft cross section area moment of inertia that may vary along the length of the golf club shaft, P is the axial compression applied to the shaft that may also vary along the length of the shaft, m is the mass per unit length that may vary along the length of the shaft, and w is the lateral deflection which is a function of time and position along the length of the shaft. The first term of Equation (1) relates how the beam bending stiffness is affected by inertial loads through the second spatial derivative of the shaft internal moment (the bracketed term that includes second order spatial derivative of the deflection) with respect to the axial coordinate. The second term of Equation (1) is generally small and is typically neglected. The last term in Equation (1) represents inertial load (per unit length) resulting from motion, where force equals mass times the second derivative of the deflection with respect to time.

When a beam is under compression, the compressive load reduces the apparent bending stiffness of the beam by amplifying the lateral deflection. This effect can be visualized by considering a ruler being compressed along its measurement axis by pressing opposing ends together. When the center of the ruler is slightly perturbed laterally, the deflection is enhanced by the compression and the ruler bends.

This behavior can be seen mathematically, to first order, by assuming a deflection as a function of time, t, and position on the shaft, x, $$w = A\sin(\omega t)\sin\left(\frac{\pi x}{L}\right) \quad (2)$$

where $\omega$ is the natural frequency of motion, L is the shaft length and A is an arbitrary constant. This simplifying assumption is a good one since Fourier theory states that any bounded analytic function can be approximated by a series of sines and cosines. Placing this deflection shape into the equation of motion and assuming that the bending stiffness, EI, and mass per unit length, m, can be represented by constant averaged values over the length of the shaft, $\overline{EI}$ and $\overline{m}$, and that P is uniform, yields $$\left[\frac{\pi^4}{L^4}\overline{EI} - P\frac{\pi^2}{L^2} - \overline{m}\omega^2\right]A\sin(\omega t)\sin\left(\frac{\pi x}{L}\right) = 0 \quad (3)$$

which, when solved for the natural frequency by setting the square bracketed term equal to zero, gives $$\omega = \sqrt{\frac{\pi^4 \overline{EI}\left(1 - \frac{PL^2}{\pi^2 \overline{EI}}\right)}{\overline{m}L^4}} \quad (4)$$

To first order, Equation (4) shows how the apparent stiffness, the numerator of the quotient under the square root sign, decreases with increased compression. For reference, the general buckling load for a uniform beam under uniform compression is $$P_{buckling} = \frac{a\pi^2 \overline{EI}}{L^2} \quad (5)$$

so that a compressive load equal to 20% of the buckling load results in a 20% decrease in stiffness and a corresponding 10% decrease in natural frequency.

For beams of general cross sections, moduli, mass per unit length, and preloading that vary with the axial coordinate, expressions analogous to Equations (2)–(5) do not exist in closed form, and full analysis is necessary for accurate predictions. However, the behavior for more complicated geometries and loading is generally similar to the simple case illustrated above.

This invention may be applied to metal, wood, and composite shafts as long as the shafts are hollow or hollowed to allow the insertion of the invention. The tensioning member may be affixed to any point along the shaft's length. This allows tailoring of the variable stiffness length of the shaft. For full length golf club shaft embodiments a tensioning wire/cable assembly may be integrated into the butt and hosel ends of the shaft. The tensioning means may comprise a single wire or cable, or multiple (twisted or untwisted) wires.

The wire can be restrained from dynamic vibration within the shaft by filling the enclosed volume, either entirely or partially, with low density foam or a similar material. The wire can also be restrained from dynamic vibration by placing form fitting inserts down the length of the wire and affixing them to the shaft, by glue or compression resulting from expansion, thus allowing the wire to run freely through the insert while restraining its lateral motion.

Figure 2:
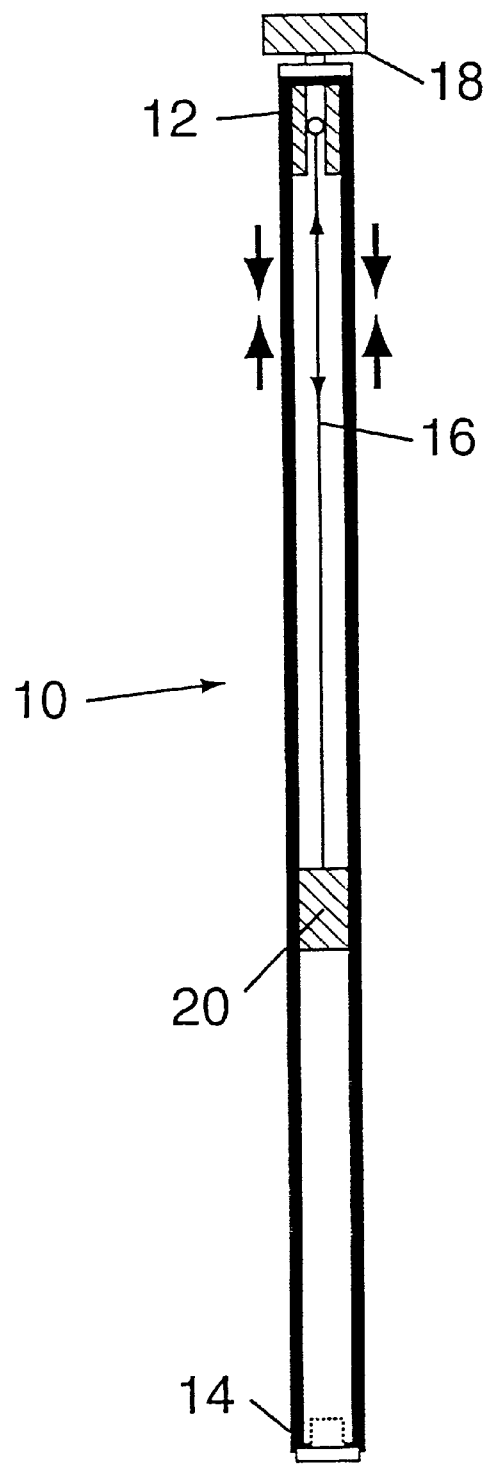
FIG. 2 shows another embodiment of a golf club shaft according to the invention.
Figure 3:
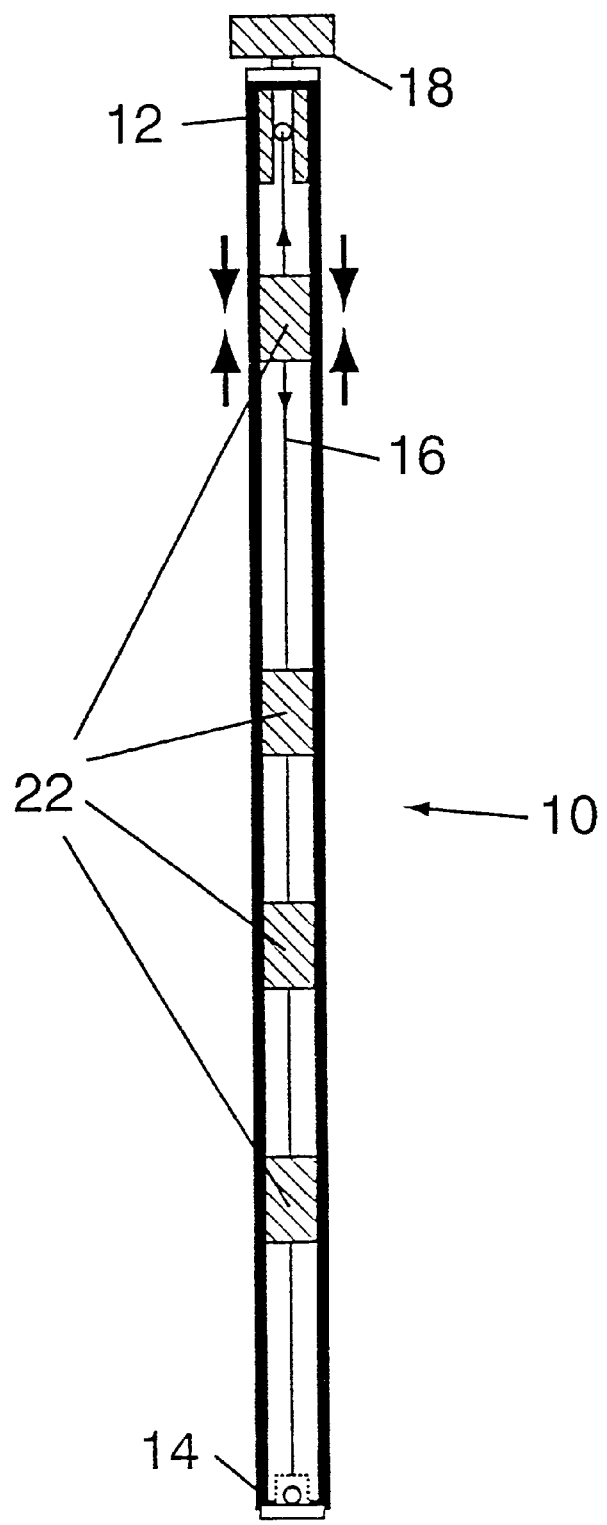
FIG. 3 shows a further embodiment of a golf club shaft according to the invention.

Three embodiments of the invention in the context of a golf club are shown in FIGS. 1–3. FIG. 1 shows a golf club shaft 10 having a butt end 12 and a hosel end 14, with a tensioning wire or cable 16 secured at both ends of the shaft. A variation mechanism 18 is located at the butt end 12 of the shaft, where it is readily accessible to the user of the club. FIG. 2 shows a similar golf club shaft, further comprising a wire termination insert 20 in the interior of the shaft. In this embodiment of the invention, the wire 16 extends only part way into the shaft, reaching from the butt end 12 to the termination insert 20. FIG. 3 shows yet another golf club shaft, this one having a plurality of constraint inserts 22, made for example from low density foam, which restrain lateral motion of the wire 16.

The internal tensioning wire/cable is preferably steel (piano wire), titanium, aluminum, other metal alloys, or a corrosion resistant plastic such as nylon. The butt end plug and tensioning mechanism are preferably made from a corrosion resistant, compression bearing material, such as aluminum, titanium, or an appropriate plastic, that transmits the preload force to the external shaft. The hosel end plug and wire/cable affixing mechanism are preferably any of lead, titanium, aluminum, other metal alloys, or an appropriately strong and corrosion resistant plastic.

A similar system for a fishing rod has been described by Carver, in U.S. Pat. No. 4,024,666. Carver's system transmits force to the rod through an interior cable and a plurality of force transmitter/receiver pairs. The stated purpose of the cable is to stiffen the rod in the longitudinal direction by tightening the cable. The instant invention, on the other hand, is used to reduce a shaft's bending stiffness by tightening the cable. The present invention does not use the force transmitter/receiver pairs described by Carver, and indeed, such transmitter/receivers would tend to negate the intended effect of the invention.

Figure 4A:
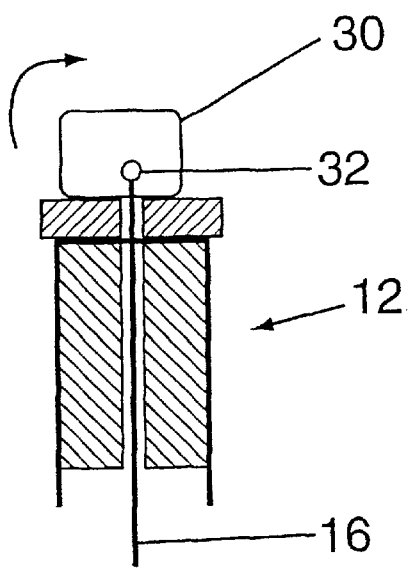
FIG. 4 shows six embodiments of variation means according to the invention.

A number of wire/cable tension variation systems are suitable for use with the invention. Several such systems are shown in FIG. 4 as applied to a golf club. FIG. 4a depicts a cammed lever variation system having four settings that span the accepted stiffness range for golf club shafts. As cam 30 is rotated in the direction of the arrow, the tension is increased on wire 16, resulting in a softening of the shaft. There are four settings for the illustrated cam 30, corresponding to the four faces of the cam, each of which is at a different distance from the attachment point 32 of the wire. As shown, the wire tension is at its lowest setting, corresponding to the stiffest shaft setting. It will be apparent to those skilled in the art that this type of variation system is not limited to a four-faced cam, but may be used with a cam having a different number of faces or with a continuous cam, as long as the variation system is capable of holding its setting. The illustrated cam 30 is held in any of the four settings by pressure on the flat face of the cam; a continuous cam may use a set screw or the like (not shown) to achieve the same end.

Figure 4B:
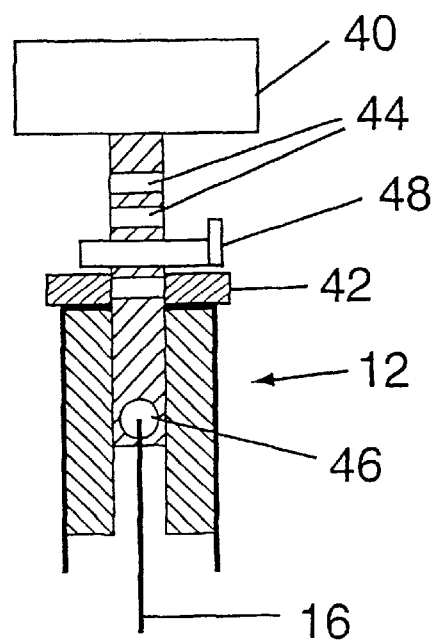

FIG. 4b depicts a plunger clevis/cotter pin variation system having four settings that span the accepted stiffness range for golf club shafts. In this arrangement, plunger clevis 40 passes through plug 42, which is attached to the butt end of the shaft 12. The clevis 40 is provided with several holes 44 perpendicular to its axis, and is attached to the wire 16 at point 46. A cotter pin 48 is adapted to slide into any of the holes, thereby varying the position of the plunger clevis 40 relative to the plug 42. It will be apparent to those skilled in the art that this type of variation system is not limited to having four levels, nor are the illustrated shapes of the clevis and cotter pin intended to be limiting.

Figure 4C:
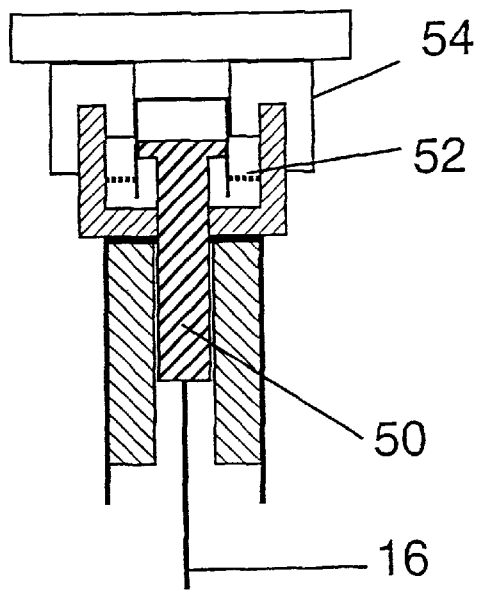

FIG. 4c depicts a pneumatic or hydraulic variation system, where a constant force is applied to a piston 50 by a working fluid 52 applies a constant tension to the wire 16. A pumping mechanism 54 allows a golfer to vary the tension by pumping working fluid 52 through a one-way valve (not shown). The tension can be relieved by opening the valve to allow back flow. This type of system is continuously variable over a range of tensions.

Figure 4D:
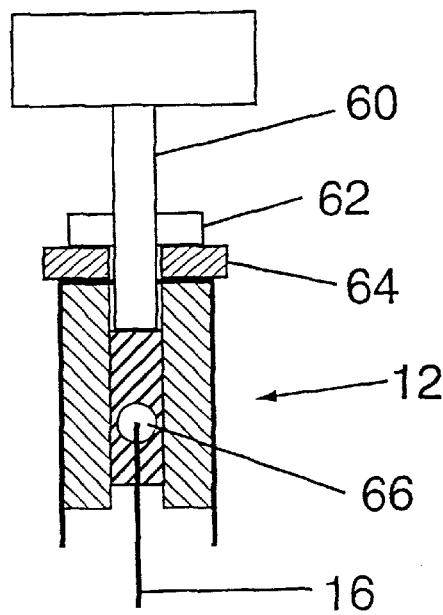

FIG. 4d depicts a lead screw variation system comprising a threaded lead screw 60, a threaded lock fitting 62, and a guide 64 attached to the butt end 12 of the shaft. The threads of the lead screw 60 engage the lock 62, which can thus be set at any point on the length of the lead screw 60. The lock is held in compression fit with the guide 64, allowing the lead screw to apply a tension to the wire 16. The attachment point 66 is preferably designed not to twist the wire when the lead screw 60 is turned. This type of system is continuously variable over a range of tensions. The lead screw may be turnable by hand, or may be activated by an external actuator such as a battery powered electric screwdriver or the like. This type of system is continuously variable over a range of tensions.

Figure 4E:
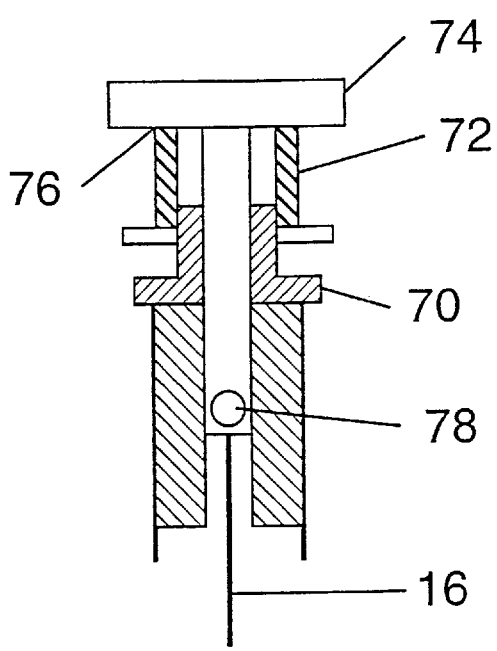

FIG. 4e depicts a threaded sleeve variation system. A plug 70 is affixed to the butt end 12 of the shaft, the plug 70 having an outer thread. An inner threaded turn sleeve 72 is engaged with the plug 70. The turn sleeve supports a head 74, and may be adapted to slip relative to the head at their point of contact 76. The head is connected to wire 16 at point 78. It will be seen that rotation of the turn sleeve 72 will raise or lower the head 74 to vary the wire tension over a continuous range.

Figure 4F:
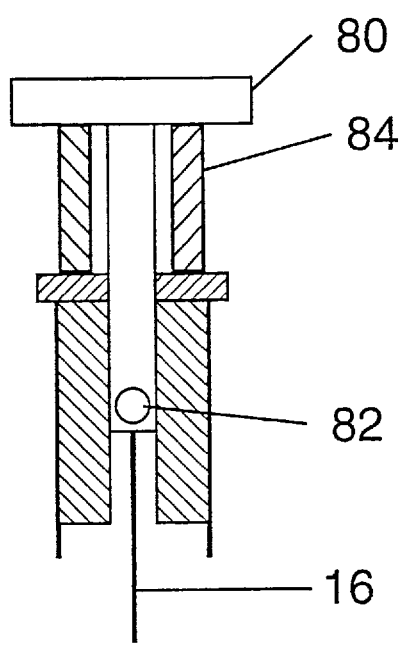

FIG. 4f depicts an active set and forget displacement actuator variation system. A head 80 is connected to the wire 16 at point 82, and a standard set and forget actuator 84 is inserted between the butt end of the shaft 12 and the head 80. Such actuators are commonly known in the art, and generally are activated by connection of a separate power source. Once the actuator has been set to the desired length (and corresponding wire tension and shaft stiffness), the power source (not shown) may be removed for the swing. This variation system can vary the wire tension over a continuous range.

EXAMPLES

A prototype shaft was built using an X (extra stiffness) staff, with a lead screw variation mechanism as shown in FIG. 4d. The flex rating (in CPM) of this shaft was measured and found to be reduced by as much as 7%, corresponding to a 15% reduction in bending stiffness, when using a dummy mass for a head.

A commercially available 250 cc titanium head was affixed to the shaft to make the prototype club. This club was tested at a driving range by a mid to low handicap golfer and by a high handicap golfer, with the stiffness setting corresponding to a 12% reduction in bending stiffness from the original shaft stiffness. Both golfers found that the resulting drives were consistently 10–15 degrees more elevated in trajectory.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A piece of sporting equipment having a variable stiffness shaft, said piece comprising:
   a hollow shaft;
   a tensioning means disposed within the hollow shaft and affixed thereto at two points of the tensioning means;
   variation means for varying the tension of the tensioning means, whereby increasing the tension of the tensioning means reduces the bending stiffness of the shaft;
   wherein the variation means is a cam.

2. The piece of sporting equipment of claim 1, wherein the sporting equipment is selected from the group consisting of a golf club, a tennis racket, a ski pole, a hockey stick, a baseball bat, a fishing pole, a hurling stick, a lacrosse stick, and a vaulting pole.

* * * * *